UNITED STATES PATENT OFFICE.

PETER HOLGER HANSEN, OF COPENHAGEN, DENMARK.

COMPOSITION CONTAINING CASEIN FOR ELECTRIC INSULATING OR OTHER PURPOSES.

SPECIFICATION forming part of Letters Patent No. 610,626, dated September 13, 1898.

Application filed February 7, 1898. Serial No. 669,465. (No specimens.)

*To all whom it may concern:*

Be it known that I, PETER HOLGER HANSEN, merchant, a subject of the King of Denmark, residing at 25 Guldbergsgade, Copenhagen, Denmark, have invented certain new and useful Improvements in Compositions Containing Casein for Electric Insulating and other Purposes, of which the following is a specification.

Milk curds or cheese deprived of most of the watery part is placed in very hot water and kneaded or worked until the fatty parts have been removed and the casein has assumed the form of small lumps of a tough and sticky consistence, but no longer. This at a temperature of 90° to 100° centigrade takes about fifteen minutes. With the casein so made or otherwise made I mix india-rubber dissolved in benzol, about three parts of the former to ten of the latter, and finely-ground asphalt. I effect this mixture either then or after removing the casein from the bath and placing it in a fresh bath of very hot water. In the latter case about ten minutes suffice for bringing the mixture to the right heat and a well-mixed condition, so that the composition can be placed in a hot mold, wherein it is subjected to a high pressure to receive the form of the article to be produced, or to bring it into sheet form I pass the material between heated rolls. After drying at a low temperature the articles are ready for use and can be sawed, turned in a lathe, or otherwise treated, like ebonite and similar materials. In addition to the india-rubber and asphalt I may use some coloring material and also, if desired, small proportions of ground bone or kaolin, gypsum, graphite, or the like.

For producing a material having insulating and other valuable properties even superior to ebonite I merely use casein, india-rubber, and asphalt and, if desired, coloring-matter.

The proportions for such insulating material are as follows: casein, from fifty to sixty parts, by weight; rubber, from thirty-five to twenty parts, by weight; asphalt, from fifteen to twenty parts, by weight; or casein, from sixty-two to fifty-five per cent.; rubber, from twenty-six to thirty-two per cent.; asphalt, from twelve to thirteen per cent.

I claim—

A composition consisting mainly of casein, india-rubber and asphalt substantially in the proportions set forth.

Copenhagen, the 27th day of December, 1897.

PETER HOLGER HANSEN.

Witnesses:
   J. WUTENGAAR,
   J. OHLMANN.